United States Patent [19]

Cramm

[11] Patent Number: 4,970,643
[45] Date of Patent: Nov. 13, 1990

[54] MECHANISM FOR LOCK-UP FREE CACHE OPERATION WITH A REMOTE ADDRESS TRANSLATION UNIT

[75] Inventor: Colin H. Cramm, Toronto, Ontario, Canada

[73] Assignee: Control Data Corporation, Minneapolis, Minn.

[21] Appl. No.: 192,258

[22] Filed: May 10, 1988

[30] Foreign Application Priority Data

Mar. 7, 1988 [CA] Canada .................................. 560682

[51] Int. Cl.$^5$ ............................................. G06F 13/00
[52] U.S. Cl. ................................ 364/200; 364/243.41; 364/243.44; 364/266.5
[58] Field of Search ................................ 364/200, 900

[56] References Cited

U.S. PATENT DOCUMENTS

| 4,370,710 | 1/1983 | Kroft .................................. 364/200 |
| 4,821,171 | 4/1989 | Calamari ............................. 364/200 |
| 4,843,542 | 6/1989 | Dashiell et al. ..................... 364/200 |

Primary Examiner—Gareth D. Shaw
Assistant Examiner—John Loomis
Attorney, Agent, or Firm—Robert M. Angus

[57] ABSTRACT

It is known to use a miss information holding register in a cache memory organization to store the details of a CPU load request on a cache miss so that the cache may accept subsequent requests pending the receipt of data in respect of the first request. In the subject invention, this organization is modified for use with a virtual addressable cache memory by incrementing a counter which overflows to free the miss information holding register with each untranslatable response signal from the address translation unit relating to the request stored in the miss information holding register. The modified organization also clears the used bit associated with the location in the cache tag memory to which the tag addresses of the request has been stored upon receipt of the first untranslatable response signal from the address translation unit in respect of the request.

10 Claims, 9 Drawing Sheets

MECHANISM FOR LOCK-UP FREE CACHE OPERATION WITH A REMOTE ADDRESS TRANSLATION UNIT

This invention relates to a form of cache memory organization for use with a digital computer using virtual addressing. In particular, this invention relates to a lock-up free cache memory organization for a cache addressable by virtual addresses.

A cache memory is considered to be any small, fast memory holding the most recently accessed data and its immediately surrounding neighbors in a logical sense. Because the access time of a cache memory is usually an order of magnitude faster than the main or central computer memory, and the standard software practice is to localize data, the effective memory access time is considerably reduced in a computer system in which a cache memory is included.

The cache memory itself is well known in the art— see, for example, U.S. Pat. No. 3,601,812 issued Aug. 24, 1971 to Wiesbecker entitled "Memory Systems", and U.S. Pat. No. 3,896,419 issued July 22, 1975 to Lange et al entitled "Cache Memory Store in a Processor of a Data Processing Machine".

In processors employing a virtual memory addressing scheme, cache memories may be based on either real or virtual addresses. Where the cache is addressable by real addresses, a virtual-to-real address translation is required before accessing the cache. However, in caches addressable by virtual addresses, the virtual-to-real address translation need only be made when the main memory must be accessed (main memory is always addressed using real address). Thus, the translation need only be made on a cache miss, i.e. when the data requested is not found in the cache, and in certain instances in which the same data present in both the cache and central memory must be accessed. For both real and virtual address based caches, address translation is usually performed by a separate hardware address translation unit (an ATU). For each translation initiated, the unit responds with either a real address or a response indicating that the ATU is unable to translate the requested address. The "unable to translate" response implies that there is at present no real address corresponding to the requested virtual address. When this situation occurs, a special software sequence is executed by the processor to handle this exception. Note that in the following, the "unable to translate" response from the ATU will be referred to as the "untranslatable" or "no translate" (NT) response.

The great majority of prior art cache organizations including aforementioned U.S. Pat. No. 3,896,419, are arranged so that the cache locks up from the point at which a miss is detected until data requested by the cache is received from central memory. That is, the cache does not accept any more requests in this interval. This has obvious determinantal effects on performance and is a particularly severe problem where the cache services both the instruction and execution elements in the processor as a cache miss for an instruction element request which prefetches instructions can immediately prevent the execution element from processing instructions as well.

One attempt to solve the problem of cache lock-up is described in U.S. Pat. No. 4,370,710 issued Jan. 25, 1983 to Kroft entitled "Cache Memory Organization Utilizing Miss Information Holding Registers to Prevent Lockup from Cache Misses". This implementation makes use of a number of registers called miss information holding (MIH) registers wherein one such register is allocated on each cache miss which occurs for a load request.

The number of miss information holding registers determines the number of load misses which can be serviced concurrently before the input to the cache does eventually lock up.

Certain information is stored in each miss information holding register when it is allocated. Among other items, the information stored includes the following three fields of address information:

(a) input request address tag;
(b) input request set address; and
(c) cache column address of the cache frame allocated as a result of the miss.

At the same time that a miss information holding register is allocated, a request to central memory is initiated for all the words in the cache line containing the requested word which caused the miss. When (and if) these words arrive back at the cache, the set address and cache column address information previously stored in the miss information holding register is used to determine the cache data RAM location in which the returning words are saved.

Since further requests may be accepted by the cache while the words requested as a result of a previous load miss are still in transit from central memory, there is a possibility that a further request may be for one of the words that is in transit. This case is detected by comparing the input request address for all new requests with the input request address tag field contained in all currently allocated MIH registers. If a match is detected, this implies that a request was made for a word which is still in transit. This case must be handled with the aid of other information stored in the miss information holding registers.

When all words requested from central memory as a result of a load miss have returned, then a miss information holding register may be de-allocated in order that it can be re-used by another subsequent miss. In order to determine when any given miss information holding register may be de-allocated, a miss information holding register counter is used for each MIH register. This counter is initialized to zero and incremented when each word in the cache line is returned to the cache from central memory. The counter must contain a total of n bits when there are $2^n$ words in a cache line. When the counter overflows, all requested words have been returned, and the appropriate miss information holding register is de-allocated.

While the organization of U.S. Pat. No. 4,370,710 will prevent lock-up in real addressable systems, it will not function satisfactorily in virtual addressable computer systems having virtual addressable caches. More specifically, in a system incorporating an ATU and a virtual addressable cache organized as disclosed in the Kroft Patent, if an MTH register were allocated prior to the resolution of the address translation, and an untranslatable condition occurred in the ATU, no memory data would be returned to the MIH register. Hence the MIH register counter is not incremented and so the MIH register will never be de-allocated and will be unavailable for further use. Eventually, all the miss information holding registers will become "frozen" and unavailable so that the cache will permanently lock up on the next cache miss. Similarly, if the cache tag directory were updated for a load miss prior to the resolution of the address translation, and an untranslatable condition occurred in the ATU, no data would be returned from memory. Hence the contents of the cache tag directory and the cache data RAM would be inconsistent—the cache tag directory Would falsely indicate that the data words in question were present in the cache data RAM.

If, on the other hand, it is decided to allocate an MIH register and update the cache tag directory after the result of the address translation from the ATU occurring as a result of the miss is known, then should the time required for completion of an address translation be greater than the time required to determine a cache hit or miss condition, a cache access time penalty is imposed which degrades the performance of the digital computer. This is particularly true in cases where the ATU is remote from the cache.

The present invention provides a lock-up free cache organization for a virtual addressable cache which can normally continue to accept further requests notwithstanding the fact that the result of an address translation for a previous miss may as yet be unknown.

Accordingly, there is provided a virtual addressable cache memory organization for use with a central processing unit and an address translation unit for translating a system virtual address to a real memory address comprising a virtual addressable cache memory; cache hit determination means; determination means to determine the address of an available location in cache memory upon determination of a cache miss by said cache hit determination means; at least one miss information holding register for storing the system virtual address and the address of the available location in cache memory determined by said determination means of central processing .units load request upon determination of a cache miss; first indicator means to indicate a miss information holding register is allocated for storing information in respect of a load request on a cache miss in respect of said load request; second indicator means to indicate an allocated miss information holding register is de-allocated when an address translation unit is unable to translate the system virtual address in respect of the load request for which said miss information holding register was allocated.

In the drawings which illustrate embodiments of the invention,

Figure 1:
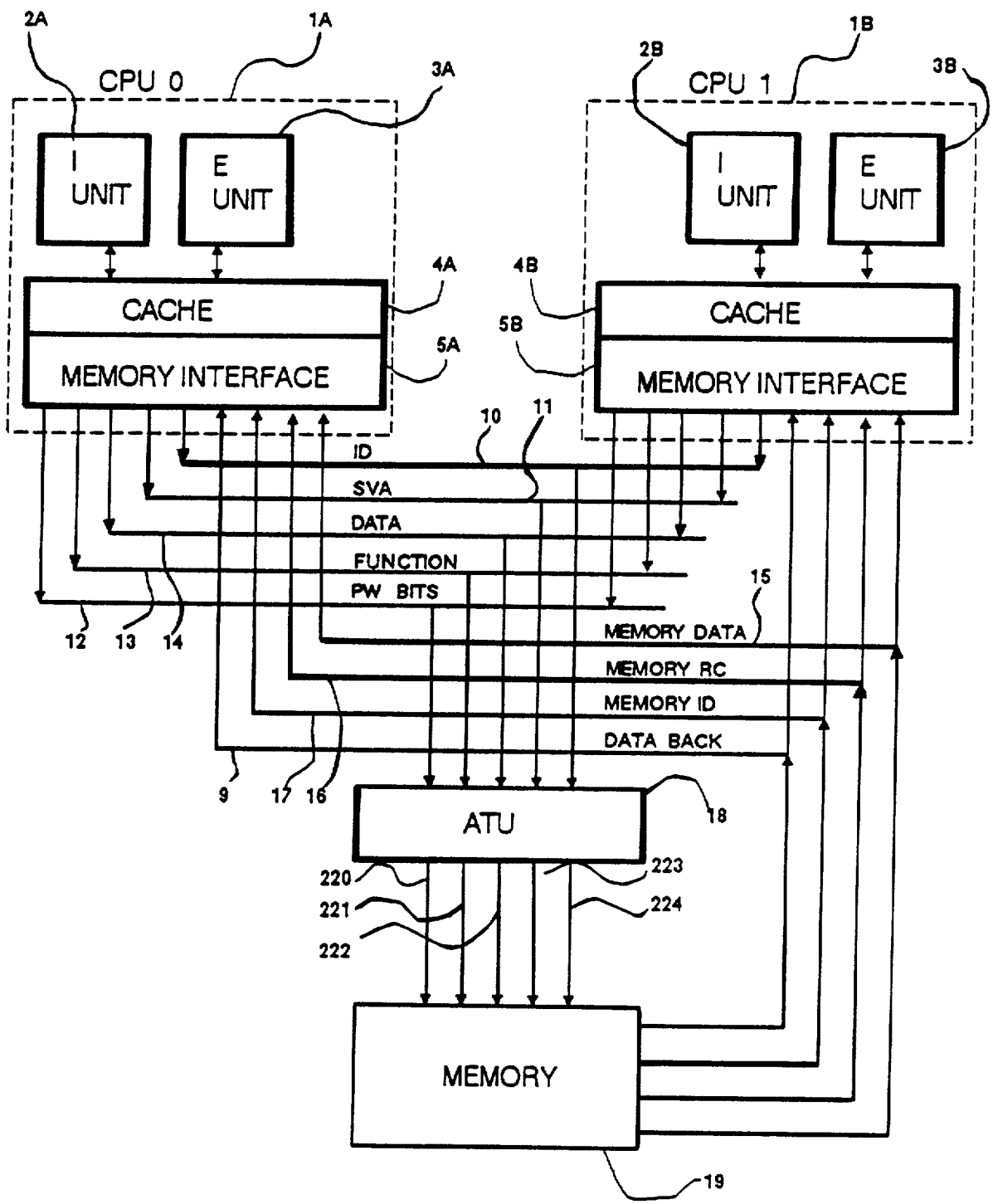
FIG. 1 is a block schematic of a multi-processing system constructed in accordance with the present invention.

Turning now to FIG. 1, the multiprocessing system comprises two central processors, CPUO indicated at 1A and CPU1 indicated at 1B. Although this invention is described with reference to a multiprocessing system containing two processors, it is understood that the invention can also be incorporated into a multi-processing system with any number of central processors, including one.

Each central processor in FIG. 1 includes an instruction unit (I unit), 2, and an execution unit (E unit), 3. The E unit and I unit of each central processor are connected for communication with cache 4 and memory interface (MI) 5. Each memory interface is connected so as to be able to send information to ID bus 10, SVA bus 11, data bus 14, function bus 13, and PW bits bus 12. Each of these buses input the address translation unit (ATU) 18. By the use of common buses, the cost of ATU hardware is shared between processors. Outputs from the ATU 18 input main memory 19 via PW bits path 220, function path 221, data path 222, RMA path 223, and ID path 224. Outputs from main memory 19 input memory data bus 15, memory RC bus 16, memory ID bus 17 and data back line 9. These four buses input the memory interfaces 5.

In operation, both the E unit 3 and I unit 2 issue requests for data words. Some requests may be satisfied by the cache and others require a central memory access, through the memory interface 5. Each request to central memory requires an address translation by the address translation unit (ATU) 18, because the request from each central processor employs a system virtual address (SVA), but the memory is addressed via a real memory address (RMA).

A request includes a code indicating the function (loading or storing), the SVA, a code identifying the requestor, and, in the case of a store request, the new data to be associated with the SVA and the partial write bits. When a main memory access is required, these components of the request pass to the ATU via the function, SVA, ID, and data buses respectively. After the ATU translates the SVA to an RMA, the RMA, along with the other components of the request, pass to memory 19 on paths 220, 221, 222, 223, and 224.

Each load request to the main memory is treated as a request for a line of data. A line of data may be of any prescribed size, and in this preferred embodiment is taken as comprising four data words. Thus, for each load request, four consecutive requests for a data word are made to the main memory via the ATU. Upon retrieving a word, the memory passes the word to memory data bus 15, a response code (RC) to memory RC bus 16, the requestor identifier to memory ID bus 17, and a signal to data back bus 9 indicating the main memory has returned data. These are directed to cache and requested words are directed on to the processors where the requesting processor recognizes its identifier and accepts the word and the RC.

In the event that the ATU encounters a condition where it is unable to translate a request, it must so inform the CPU which made the request. This is done indirectly, via a special "untranslatable" function code from the ATU which is passed to the central memory via function path 221. The central memory then in turn signals the appropriate CPU of this condition via a special code on the RC bus 16.

Figure 2:
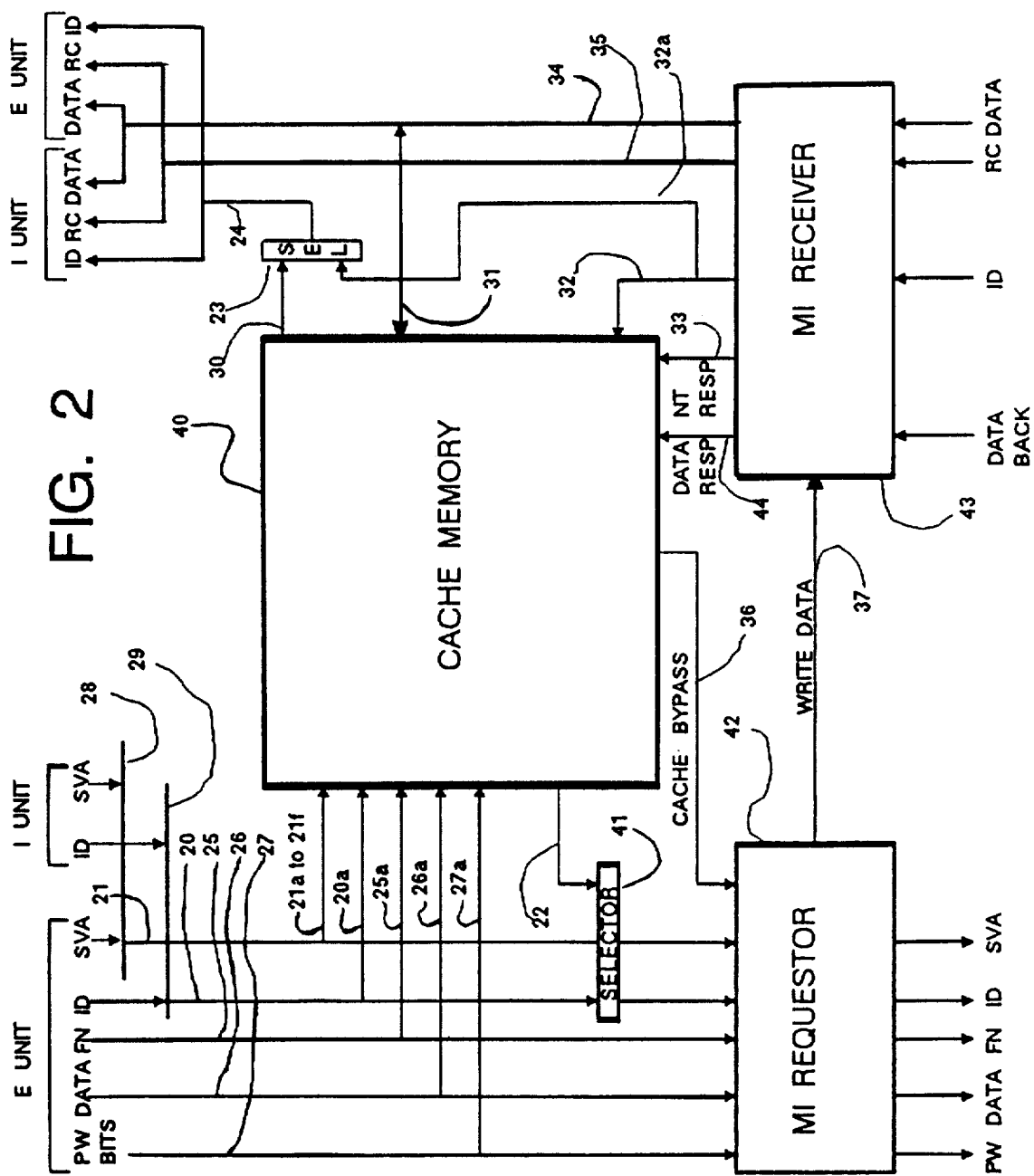
FIG. 2 is a block schematic of a portion of one central processing unit constructed in accordance with the present invention.

The relationship between the cache and the memory interface (MI) is shown in greater detail in FIG. 2.

PW bits path 27, data path 26 and function (FN) path 25 are connected from the E Unit directly to MI requestor 42 and cache memory 40 (via lines 25a, 26a, and 27a). The ID and SVA of a request are connected from the E unit and I unit through common buses 28 and 29, respectively, to paths 20 and 21. Path 20 inputs the MI requestor via selector 41 and path 21 directly inputs the MI requestor. Paths 20 and 21 are also connected to cache memory 40 via branches 20a and 21a to 21f. A cache generated ID line 22 is connected from cache to selector 41 and a cache bypass line 36 is connected from the cache to the MI requestor. The MI requestor has output paths to the common buses described in FIG. 1.

As well, the MI requestor has a write data path 37 inputting the MI receiver 43. The MI receiver 43 has input ID, RC, data and data back paths from buses 15 through 17 and 9 of FIG. 1. The MI receiver has output RC path 35, and data path 34 which input the E unit and I unit, ID path 32 which inputs the cache memory 40 with branch 32a which inputs the E unit and I unit via selector 23, and NT RESP line 33 and data response line 44 which input the cache. Cache memory 40 also has input/output data path 31 and output ID path 30, which inputs the E Unit and I Unit via selector 23.

In issuing requests, the I Unit and E Unit place an SVA on bus 28 and a requestor identifier on bus 29. When the E Unit issues a store request, it also places a function code (FN) on path 25, a data word on path 26 and partial write bits on PW path 27. Since the only I unit function is a load, it need never supply the additional information supplied by the E Unit on a store request.

The requestor identifier (ID) is an 8-bit tag which is provided with the request in order to identify the source of the request. This identifier is transmitted along with the request, and returned with the request. Each CPU unit will recognize only its own ID on a cache response, and accept the data supplied with this ID. As is more fully described hereinafter, some manipulation and mapping of a requestor identifier is performed by the cache on a load miss before the identifier is passed to central memory, however, an inverse mapping is also done in the cache on receipt of a response, so that in the end the requesting unit receives the same ID it transmitted when the cache request was made.

The details of the organization of the cache are shown in FIGS. 3 to 7.

Figure 3:
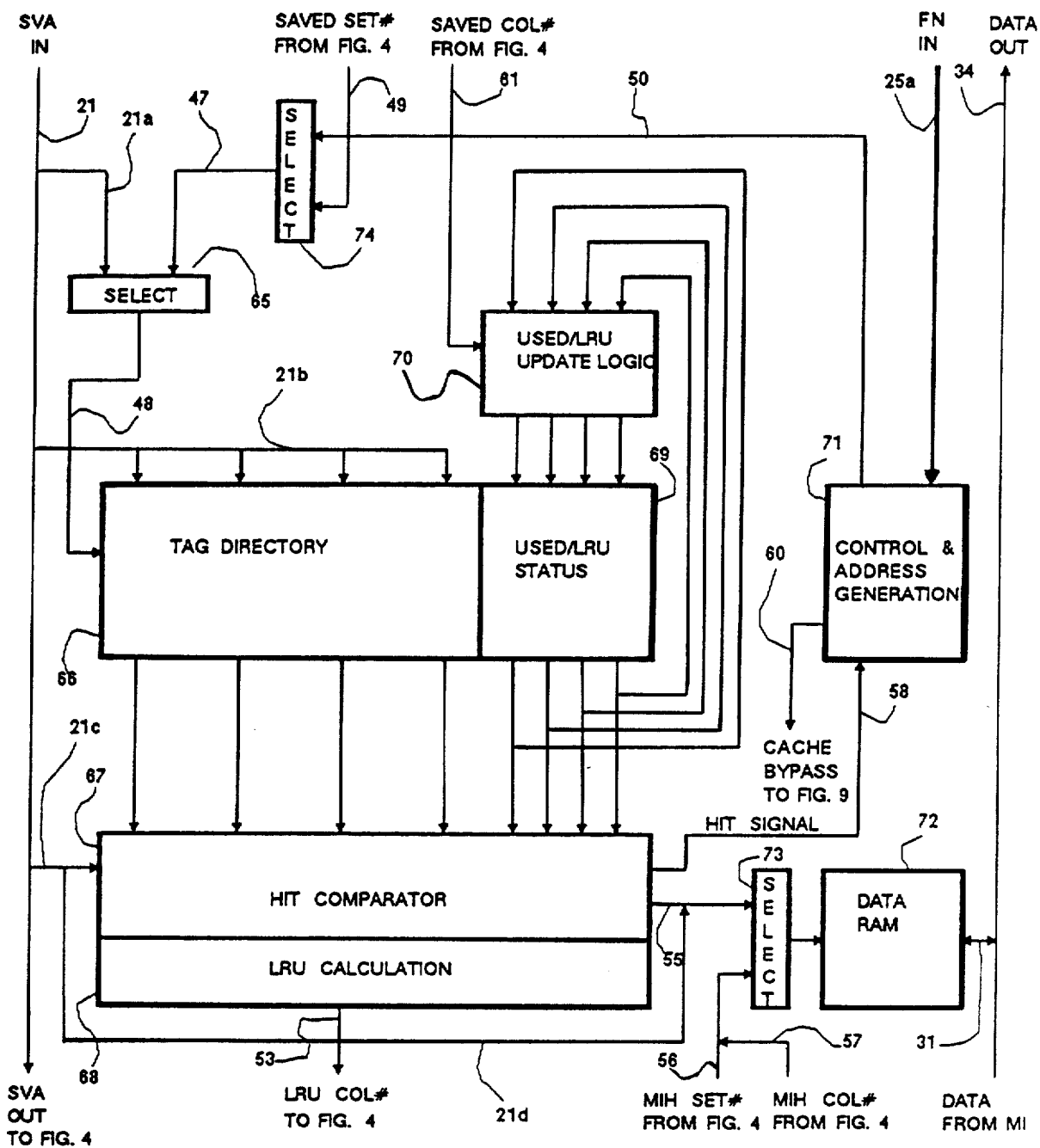
FIG. 3 is a block schematic of a portion of the cache memory organization of the present invention.

Turning first to FIG. 3, it is noted that the RAM memories of the cache comprise tag directory 66, used/LRU status memory 69 and data RAM 72. It can be seen that the request address input path (SVA) 21 inputs selector 65 via branch 21a. The output path 48 of the selector inputs tag directory 66 and used/LRU status 69 Both the tag directory and the used/LRU bits are divided into four columns for a 4-way set associative cache organization. A 4-way set associative cache is shown for illustrative purposes only—the techniques described in the present invention may equally well be applied to caches with different degrees of set associativity. The outputs of the tag directory and the used/LRU status RAM are passed to a hit comparator 67 The SVA path 21 also inputs the hit comparator via branch 21c. The hit comparator inputs the control and address generation unit 71 via hit signal line 58, LRU Calculation Unit 68, and selector 73 via path 55. Branch 21d of path 21c merges with path 55 in order to provide the complete input to one side of selector 73.

The output of the used/LRU status RAM also inputs used/LRU update logic 70 which, in turn, inputs used/LRU status RAM 69.

The output of selector 73 inputs data RAM 72 and data RAM 72 is connected for two-way communication with data path 34 via line 31.

Control and address generation unit 71 receives as inputs the aforementioned line 58 and function path 25a. The control and address generation unit outputs via cache bypass signal line 60 and path 50 which inputs selector 74. The output of selector 74 inputs the aforementioned selector 65 via path 47.

Figure 4:
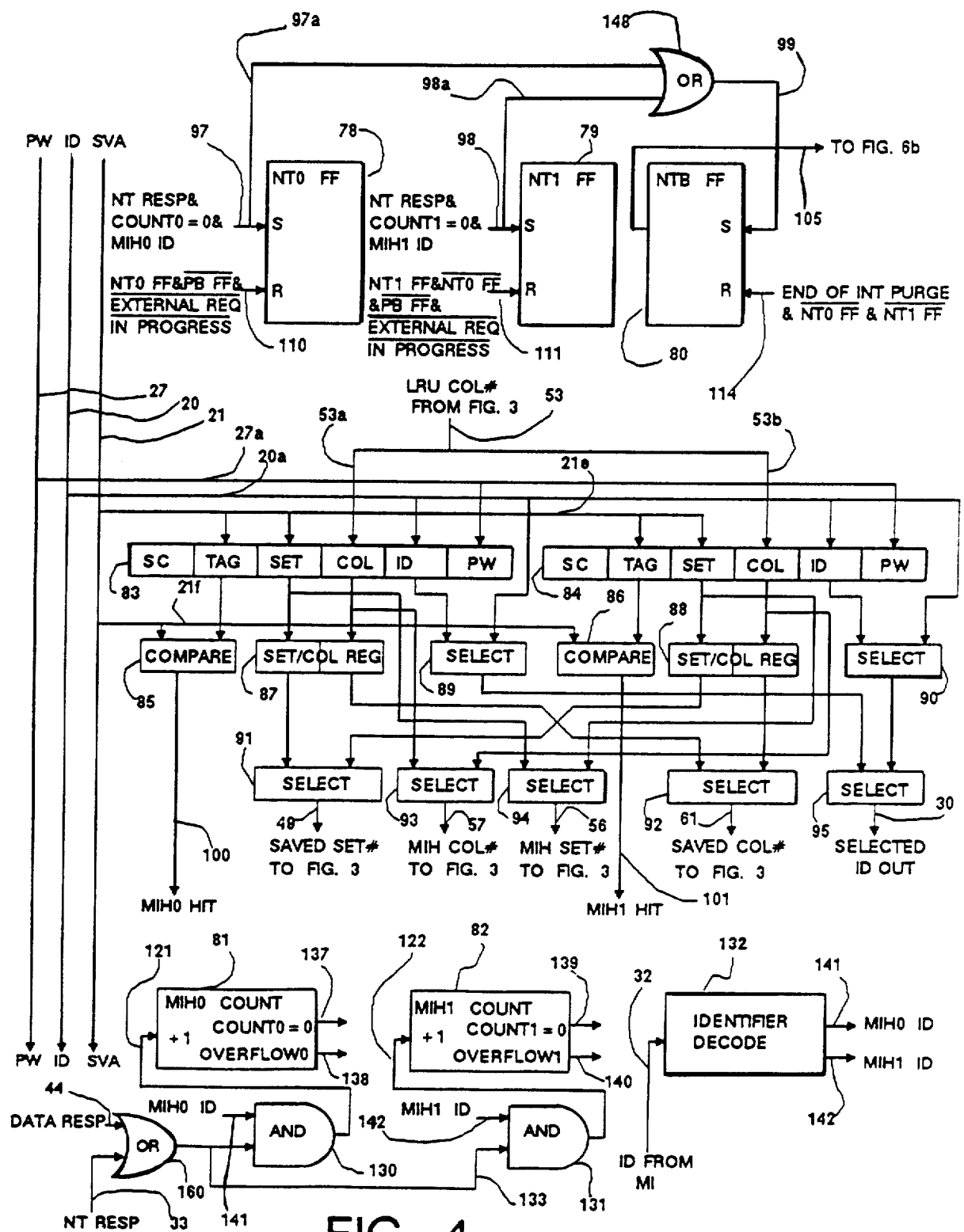
FIG. 4 is a block schematic of another portion of the cache memory organization of the present invention.

Turning next to FIG. 4, SVA path 21 also inputs the tag and set fields of miss information holding (MIH) registers 83 and 84 via branch 21e. The fields of the miss information holding registers are set out in greater detail in FIG. 5a. From left to right it is seen that each MIH register contains four send-CPU indicators, one for each word in the four word line sent to cache on a load request; an address tag field which contains the SVA of a request; a set address field which contains the bits of the SVA which represent the addressed set; a column address field which contains the cache column allocated to a new line; a request identifier which is a 32 bit field, 8 bits for the identifier for each word in the line; and a partial write bit field which is also a 32 bit field, 8 bits per word of the block.

Returning to FIG. 4, SVA path 21 also inputs compare units 85 and 86 via branch 21f. A path from the tag field of each MIH register forms the other input to these compare units.

ID path 20, via branch 20a, inputs the ID field of each MIH register and, as well, forms one input to each of selectors 89 and 90. A line outputting from the ID field of each MIH register forms the other input to selectors 89 and 90. PW path 27 inputs the PW fields of each MIH register via branch 27a.

The LRU calculation unit 68 of FIG. 3 outputs via branches 53a and 53b of path 53 to the column field of each MIH register. The output of the set field of MIH register 83 is connected to one input of set/column register 87 and to one input of selector 94. The output of the column field of this MIH register is connected to the other input of the set/column register 87 and one input of selector 93. Similarly, the set field of MIH register 84 inputs set/column register 88 and selector 94 and the column field inputs set/column register 88 and selector 93.

The outputs of both set/column registers input selectors 91 and 92. The output of selectors 89 and 90 both input selector 95.

Selector 91 outputs via path 49 to selector 74 of FIG. 3. Selector 92 outputs via path 61 to used/LRU update logic 70 of FIG. 3. Selector 94 outputs via path 56 to selector 73 of FIG. 3 as does output path 57 of Selector 93. Selector 95 outputs via line 30 to the I Unit and E Unit, as shown in FIG. 2 The compare units 85 and 86 output to MIH hit lines 100 and 101, respectively.

Identifier decoder 132 receives as input ID path 32. The decoder outputs to lines MIHO ID indicated at 141 and MIH1 ID indicated at 142.

OR gate 160 receives as inputs data response line 44 and NT response line 33. The NT response line is the output of a decoder (not shown) which is input with the memory RC bus 16. OR gate 160 outputs on MI response line 133. Mi response line 133 forms one input of AND gates 130 and 131. MIHO ID line 141 forms the other input of AND gate 130 and the MIH1 ID line 142 forms the other input of AND gate 131. AND gate 130 inputs MIHO counter 81 and AND gate 131 inputs MIH1 counter 82. MIHO outputs by a count0=0 line 137 and overflow0 line 138. Similarly, MIH1 counter outputs via a count1=0 line 139 and overflow1 line 140.

"No translate" flip flops NT0, 78, and NT1, 79, indicate, when set, that an untranslatable condition has occurred for a cache miss for which the respective MIH register was allocated. NT0 is set via line 97 which is the logical AND of an NT response signal, a count0=0 signal, and a MIH0 ID signal. Similarly, the set input of the NT1 flip flop on line 98 is the logical and of an NT response signal, a count1=0 signal, and a NIH1 ID signal. The reset input of NT0 78 is on line 110 which is the logical AND of a set signal from the NT0 flip flop, a reset signal from the purge busy flip flop (which is hereinafter described), and a signal indicating no external purge request is in progress. The reset input for NT1 appears on line 111 as the logical AND of a set signal from the NT1 flip flop, a reset signal from the NT0 flip flop, a reset signal from the purge busy flip flop, and a signal indicating no external purge request is in progress.

Branches 97a and 98a of lines 97 and 98, respectively, form the two inputs of OR gate 148. The output of this OR gate inputs, via line 99, the set input of a "no translate busy" (NTB) flip flop 80. The reset input for this flip flop appears on line 114 as the logical AND of an end of internal purge signal (described hereinafter) and a reset signal from both the NT0 and NT1 flip flops.

Figure 5A:
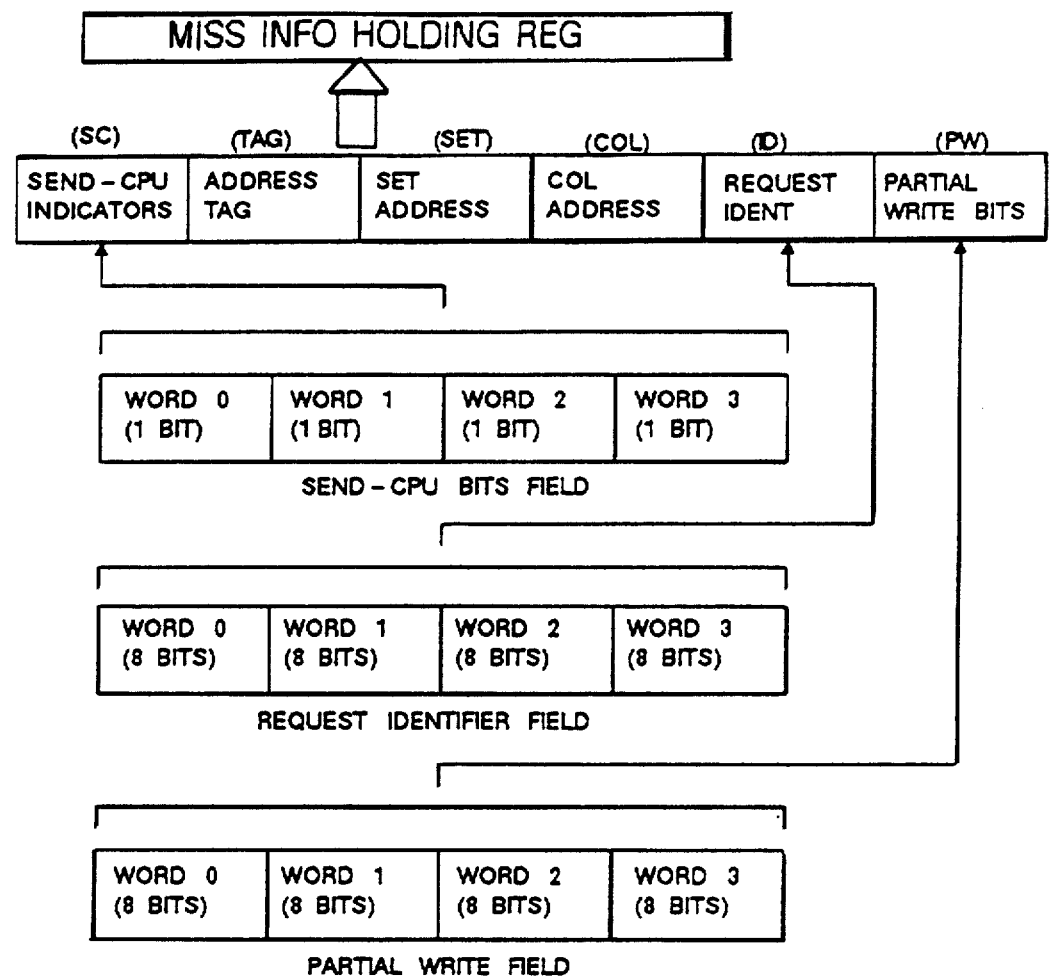
FIG. 5a is a block diagram illustrating the fields in a miss information holding register according to the present invention.
Figure 5B:
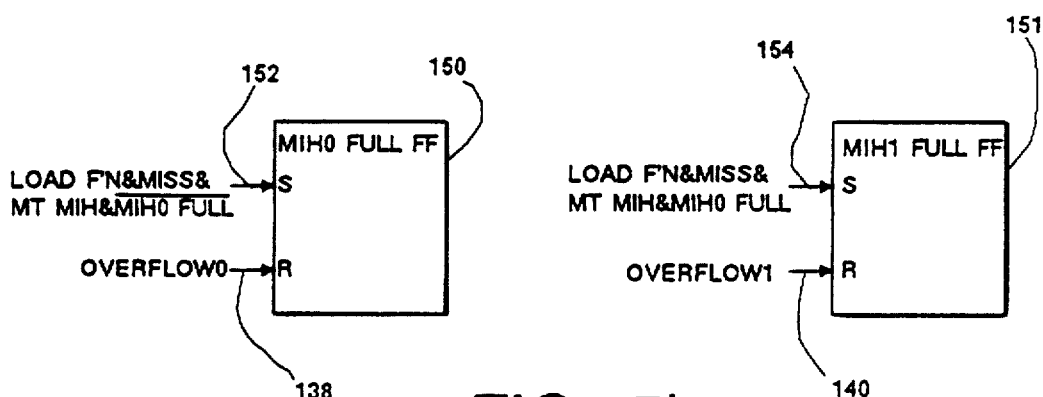
FIG. 5b is a block diagram of elements associated with a miss information holding register according to this invention.

Associated with each MIH register is a MIH FULL flip-flop 150 and 151, shown in FIG. 5b. MIH0 FULL flip-flop 150 is set by line 152 which is the logical AND of a load function signal, a cache miss signal, an empty MIH register signal, and a reset signal from MIH0 FULL flip flop 150. This flip flop is reset on line 138 by an overflow0 signal. Similarly, MIH1 FULL flip-flop 151 is set on line 154 by the logical AND of a load function, a cache miss signal, an empty MIH register signal and a set signal from the MIH0 FULL flip flop. MIH1 FULL flip flop is reset on line 140 by an overflow1 signal.

Figure 6B:
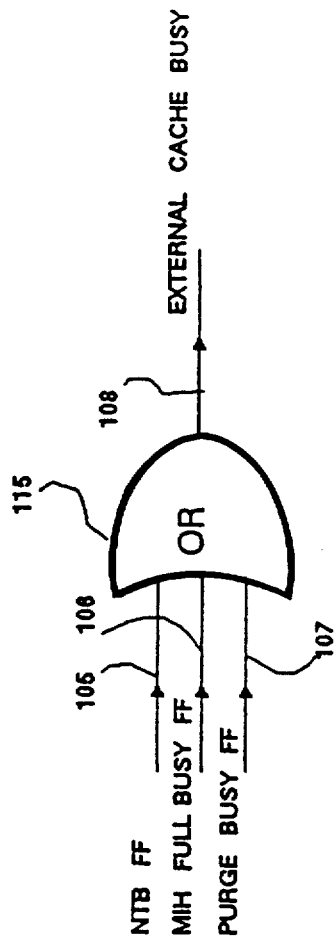
FIGS. 6a and 6b are schematic diagrams of portions of the cache memory organization of the present invention
Figure 6A:
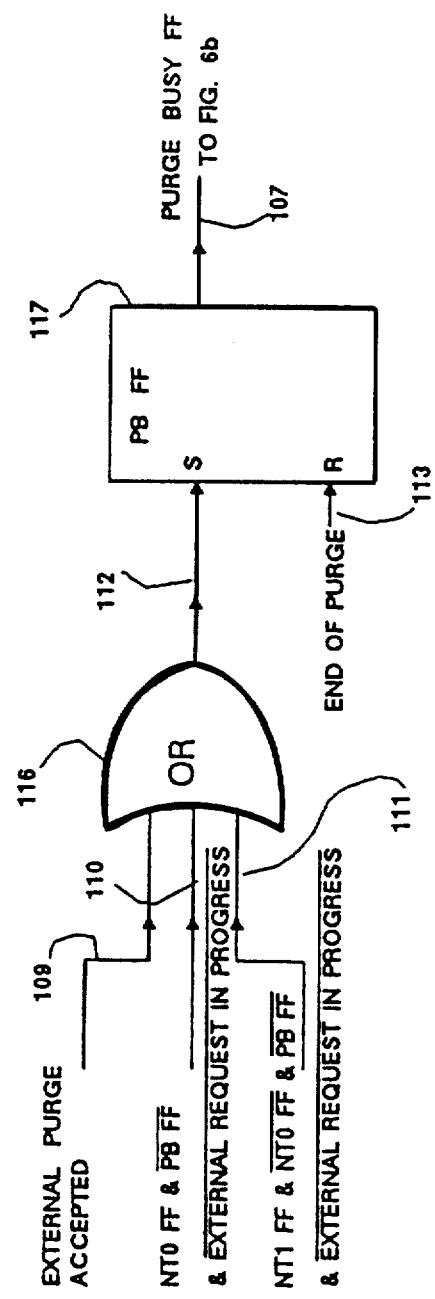

Turning now to FIG. 6a, "external purge accepted" line 109, "NT0 FF and not purge busy FF and no external purge in process" line 110 and "NT1 FF and not NT0 FF and not purge busy FF and no external purge request in progress" line 111 input OR gate 116. The output of the OR gate inputs the set input of a purge busy (PB) flip flop 117. "End of purge" line 113 inputs the reset input of this flip flop. PB flip flop 117 outputs on line 107 which, with reference to FIG. 6b, inputs OR gate 115 along with NTS flip flop line 105 and MIH full busy flip flop line 106. The OR gate outputs to external cache busy line 108.

The appropriate control signals for the various selectors would be obvious to anyone skilled in the art and are, therefore, not shown in the Figures.

In operation, returning to FIG. 3, on a request, the set number in the SVA is presented to the tag directory 66 and used/LRU status RAM 69 on path 48. This causes the tag and used/LRU status bits at the given set number in each column to output to hit comparator 67. The entire SVA is also presented to the bit comparator via path 21c. The hit comparator then compares the SVA with the tags which have a set USED bit. The hit comparator thence detects either a hit, in which one of the tags matches the input address, or a miss, in which none of the tags match the input address.

The case in which a hit is detected in the hit comparator is simplest. For a hit which is detected on a load request, in which the word requested does not belong to a line in transit from central memory, then data from data RAM 72 is supplied immediately, and no use is made of the miss information holding registers. More specifically, the column number generating the hit is supplied by the hit comparator to path 55 and the set number is supplied on path 21d. These, together, input selector 73 which addresses data RAM 72. The requestor's ID which appears on path 20 of FIG. 2, is supplied to the requestor on a load hit from line 30 of FIG. 2 after having been passed around the MIH registers on line 20a and through selector 89 or 90 of FIG. 4, to selector 95 which outputs to line 30.

For a hit which is detected on a store request in which the word requested does not belong to a line in transit from central memory, the data RAM 72 of FIG. 3 is written immediately with a word from the requestor via data path 26 (see FIG. 2), MI requestor 42, write data path 37, MI receiver 43 and data path 34. Also, because of the store-through nature of this cache organization, the store data must be written to central memory as well. This is also done via data path 26. The requestor identifier on ID path 20 is passed to central memory along with the data, via the memory interface requestor in FIG. 2. After the store is complete in central memory, the memory returns a response code and an associated requestor identifier to so inform the CPU. The identifier returns via the memory interface receiver 43 and ID path 32a shown in FIG. 2. Note that the returning identifier is not further processed in the cache in this case.

The cache bypass control signal on line 36 of FIG. 2 is derived by the control and address generation unit 71 in part from the FN signal on line 25a and the hit (or miss) signal on line 58. This cache bypass signal is passed to the memory interface requestor. When this signal is asserted, it indicates that a request which was just accepted should be passed through the memory interface to the ATU and central memory, with the eventual response being provided directly to he requesting unit via the memory interface, and not from the cache. Therefore, on a load cache miss this signal will be asserted and the request passed to central memory, while on a load cache hit, the cache bypass signal 36 will normally not be asserted, and the request will be processed entirely within the cache.

For the case in which a cache miss is detected on a store request, the cache data RAM 72 is not updated, nor is a new entry made in the tag directory as a result of this miss. This is the "no fetch-on-write" mode of operation. The central memory is always updated, however, via data path 26 of FIG. 2.

The case of a cache miss encountered on a load request is the situation in which the miss information holding registers 83 and 84 of FIG. 4 are used. In such case, a MIH register FULL flip-flop, shown in FIG. 5b, is set for the allocated register. At the same time, the request input address tag (i.e., the SVA of the request) and request set address are entered in the appropriate fields in the MIH register via path 21e.

The LRU calculation Unit 68 of FIG. 3 determines the least recently used column of cache at that set address and inputs this to the column field of the appropriate MIH register via path 53.

There are four send-CPU bits in each MIH register. The send-CPU bit corresponding to the requested word of the cache line is set in the miss information holding register.

Note that four send-CPU bits (as well as four requestor identifiers (ID) and four sets of partial write bits) are shown in FIG. 5 because this particular cache organization has four words in a cache line, however, the techniques described in the present invention could also be applied to a cache memory with any number of words in a cache line.

The request set address and cache column address mentioned above are stored in the MIH register because they will be needed by the fetched data as it returns from central memory. This set address field and cache column address field taken together represent the location of the returning cache line in the cache data RAM.

At the same time that the above entries are being made in the MIH register as a result of a load miss, the requestor identifier (ID), as issued with the cache request, is entered into the MIH register. There are four locations for IDs in the MIH register, one location corresponding to each word in the cache line. After the ID is entered in the appropriate location in the MIH register, a new ID is generated (referred to hereinafter as a cache generated ID) which is then passed via cache generated ID path 22 (seen in FIG. 2) along with the request which is made to central memory to fetch a cache line. Contained in the cache generated ID are two items of information of interest to the cache, a one bit field which corresponds to the number of the miss information holding register allocated on this miss (i.e., either 0 or 1) and a two bit field which corresponds to the word number associated with this request. The hardware for generating the new ID would be obvious to anyone skilled in the art and is therefore not shown in the Figures.

As each word returns from central memory via the memory interface, the appropriate MIH register 83 or 84 of FIG. 4 is interrogated, and the set address is retrieved from one of the registers, and passed through selector 94 and then through selector 73 of FIG. 3 to address the data RAM 72. The column address from one of the two MIH registers is passed through selector 93 and then selector 73 as another component of the address for data RAM 72. The MIH register number in the returning cache generated ID is used in order to decide which MIH register to interrogate for send-CPU status, and the word number in the cache generated ID is used to ensure that the correct one of four possible send-CPU bits within one MTH register is interrogated.

At the same time that the send-CPU status is checked on the return of a data word, the requestor identifier (ID) stored in one of four possible locations in the MIH register is retrieved and passed from the MIH register 83 or 84, through selectors 89 or 90, to selector 95 of FIG. 4. In the event that the interrogated send-CPU indicator bit is set, this ID thus obtained is passed to line 30 and returned with the associated data word from central memory. In this way, the ID that was supplied with the original request to cache is effectively regenerated.

Note that because on a load miss the MI receiver returns the cache generated ID on path 32, no E unit or I unit will accept the information returned by the MI receiver on lines 34 and 35 unless (and until) the original ID is regenerated by the cache and passed to path 30.

In result, any returning word for which the send-CPU bit is set is forwarded directly to the requesting unit as well as being written into the cache data RAM. If the send-CPU bit is not set for a given returning word, that word is simply written into the cache data RAM.

Note that on a cache load miss, a new tag entry, corresponding to the SVA on path 21 of the request which caused the miss, is entered immediately into the cache tag directory via path 21b at the column of the cache allocated by the LRU calculation unit 68; this is not delayed until the fetched cache line is returned from central memory.

The input request address entered into the miss information holding register is sufficient to detect and handle further subsequent requests for the same fetched line which may occur before that line is completely returned to the cache, as follows.

The SVA of each new request which appears on path 21 inputs comparators 85 and 86 of FIG. 4 via branch 21f. The tag field of each MIH register forms the other input of each comparator. Thus, on a receipt of a new request, if either comparator finds a match, a hit signal is generated on line 100 or 101.

A MIH hit signal on a load request is handled by making use of the send-CPU bits shown in FIG. 5 in the MIH register. The send-CPU bit corresponding to the newly requested word in the previously allocated MIH register is set. This implies that at least two send-to-CPU bits in this MIH register are now set. Therefore, when the word in question eventually returns from central memory, it will be forwarded to the requestor.

A MIH hit on a store request means that the word to be stored belongs to a line in transit from central memory. In such case use is made of the partial write bits in the previously allocated MIH register corresponding to the bytes of the word which is to be stored. These partial write bits are set at the same time that the appropriate bytes of the word in question are stored into the data RAM. As words return from central memory to cache, these partial write indicator bits in the corresponding MIH registers are checked. If any of these bits are already set, then the corresponding byte(s) of returning data are not written into the cache data RAM so as not to overwrite the previously written store data.

The hardware employed in the cache specifically to handle the occurrence of "untranslatable" (NT) responses and to allow further input requests with prior unresolved ATU translations will now be described with reference to FIG. 4.

Three special flip-flops shown in FIG. 4 are provided in the cache organization which are used when an ATU request receives an "untranslatable" (NT) response. The two "no-translate" flip-flops 78 and 79 (NT0 and NT1, respectively) show which MIH register(s) received an NT response. One of these two flip-flops is always set when the first untranslatable response for a cache request which allocated a MIH register occurs. The cache generated ID which is returned from the memory interface is decoded in identifier decoder 132 and is used to direct the first NT response of a request to either the NT0 or NT1 flip flop. More specifically, this operation results from a set control signal which is a logical AND of any NT response, a signal indicating the associated MIH counter is in its initialized state, and a signal pointing to that MIH register. NT0 or NT1 is reset when an internal cache purge requested is accepted for MIH0 or MIH1, respectively. The internal cache purge is discussed hereinafter. The "no translate busy" (NTB) flip-flop 80 is set when the first untranslatable response occurs for a cache request which previously allocated a MIH register. More specifically, the NTB flip flop 80 is set via a signal on line 99 which is the logical OR of the set signal to the NT0 flip flop 78 on line 97a and the set signal to the NT1 flip flop 79 on line 98a. The reset signal for the NTB flip flop on line 114 is a logical AND of an "end of internal purge" signal, an inverted signal from NT0, and an inverted signal from NT1. When set, the NTB flip flop indicates that no more external requests should be accepted.

The counter associated with a MIH register is incremented by any NT or data response from the main memory in respect of the load request stored in the MIH register. For four word line of data, the counter is designed to overflow on the fourth incrementation and provide an overflow signal. Upon overflowing, the count is reset to zero.

A purge busy (PB) flip-flop 117, shown in FIG. 6a, is set to indicate that the cache is presently busy processing a purge request. This purge busy flip-flop effectively generates an "internal busy" signal, distinct from the "external busy" signal which is passed to the E unit and the I unit.

The set number address and the column address contained in an MIH register are transferred from the MIH register 83 and 84 to the corresponding set/col save register 87 or 88 (of FIG. 4) immediately on detecting the first NT response. The set and column addresses may not be used directly from the MIH registers because in some instances the desired MTH register may have been re-allocated before the internal directory purge operation completes.

The sequence of operations which occurs within the cache on an NT response from the ATU via the central memory will now be described in the following.

On a store request to cache which detects a cache miss, no register is allocated, as described hereinbefore. The store request is passed directly through the memory interface, across SVA bus 11, function bus 13, ID bus 10, data bus 14 and PW bits bus 12 of FIG. 1, to the ATU. The ATU attempts to perform an address translation, but eventually detects an untranslatable condition for the word address. The ATU unit then generates a request to the central memory 19 on function path 221, SVA path 223, ID path 224, PW bits path 220, and data path 222, of FIG. 1. A special function code is supplied to indicate that this request is a result of an untranslatable condition detected in the ATU. The central memory does not respond to this special request by performing a store operation, but simply generates a response going back to the appropriate CPU with a special response code on the RC bus 16 which indicates an untransatable (NT) response for the store. Thus in the NT case, the central memory only performs a turn-around or forwarding function to transmit the NT response from the ATU back to the appropriate CPU. When the NT store response arrives back at the CPU, it is supplied directly to the requesting CPU unit, without involvement by the cache or interrogation of the miss information holding registers.

On a load request to cache which detects a cache miss, an MIH register is allocated, a send-CPU indicator is set, and the cache generated ID is made part of the request, as described previously. At the same time, a request is made through memory interface to the ATU via the address bus, function bus, and ID bus. The ATU again attempts to perform an address translation, but eventually detects an untranslatable condition for the line address. The ATU then generates a request to central memory on function path 221, address path 223, and ID path 224. Again, a special function code is supplied to central memory to indicate that the request is a result of an untranslatable condition detected in the ATU. However, unlike the store case, the ATU generates one request to central memory with the special function code for each word in the cache line. Therefore there are four of these requests in the presently described cache organization.

Each of these requests from the ATU are then turned around and a response forwarded in turn to the appropriate CPU. When the responses arrive at the CPU (with the special NT response code) they are used to reallocate the MIH register originally allocated using the miss information counters 81 or 82 of FIG. 4 in the same way as for a cache line request which did not encounter an NT condition.

As each response arrives from central memory through memory interface, it causes an interrogation of the MIH register which was originally allocated as a result of the request corresponding to the response. The send-CPU indicator for the word number of the response is checked—if it is set, the response received is forwarded to the requesting unit (along with the RC indicating that an NT condition occurred).

When the cache detects the first NT response for a load miss request, "no translate 0" (NT0) flip-flop 78 is set if the NT response is for MIH register 0, or NT1 flip-flop 79 is set if the NT response is for MIH register 1. At the same time, the "no translate busy" (NTB) flip-flop 80 of FIG. 4 is also set. The purpose of the NTB flip-flop is to prevent all other external requests for the cache from being accepted, via the cache busy logic of FIG. 6, and hence allowing the required internal cache purge operation exclusive access to the cache. Either NT0 or NT1 is set to indicate which of the two MIH registers should be used to supply the set and column addresses on the internal purge. An internal cache purge operation is initiated as soon as possible after the first NT response for a cache load miss is detected; however, all operations which were currently in progress at the time the first NT response occurred must first be completed.

When an internal cache purge operation is begun, the purge busy (PB) flip-flop 117 of FIG. 6a is also set. The purpose of the PB flip-flop is to indicate that an internal cache request is currently in progress, and that no further internal purge request can be accepted until the PB flip-flop is cleared. At the same time that PB is set at the initiation of the internal purge, either NT0 or NT1 is reset to indicate that the corresponding internal purge is being serviced and will be done. If only NT0 was initially set, then an internal purge for MIH0 is initiated and NT0 is reset. If only NT1 was initially set, then an internal purge for MIH1 is initiated and NT1 is reset. If both NT0 and NT1 were initially set, then MIH0 is arbitrarily given priority over MIH1. An internal purge for MIH0 is initiated, and NT0 is reset, while leaving NT1 set. NT1 will be reset and an internal purge cycle initiated for MIH1 immediately after the internal purge cycle for MIH0 is completed. This operation is assured by making the reset signal for NT0 78 on line 110 of FIG. 4 the logical AND of a signal from NT0 78, an inverted signal from the purge busy flip flop 117 and a signal indicating no CPU (external) request is in progress. The reset signal on line 111 for NT1 is the logical AND of the NT1 flip flop being set the NT0 flip flop being reset, the purge busy flip flop being reset and there being no external request in progress.

The first step in the internal purge cycle is to read the tag directory and used/LRU status using the set address supplied from the set/col save registers. If the internal purge cycle is for MIH0, the set address from set/col save reg 87 of FIG. 4 is selected via selector 91, selector 74 and selector 65. If the internal purge cycle is for MIH1, the set address from set/col save register 88 is used through the same selectors 91, 74 and 65.

After the tag directory and used/LRU status RAM have been read, one of the four USED bits located at the selected address is cleared before being rewritten back into the used/LRU status RAM. The bit cleared is determined according to the column address selected via selector 92 from set/col save register 87 or 88. Clearing this one USED bit effectively indicates that the corresponding data entry is no longer present in the cache.

When the appropriate USED bit is cleared, the internal purge cycle is completed and a reset signal for the PB flip-flop is generated on line 113.

This reset occurs at the end of any purge request, whether this purge was initiated as a result of an external purge request, or because of an untranslatable (NT) response.

The cache circuitry used to provide a busy signal for external cache requests during an internal purge operation is now described with reference to FIG. 6b.

The external cache busy signal on line 108 is the logical OR of the output of NTB flip-flop 80 of FIG. 4, the output of purge busy flip-flop 117, and the output of a MIH FULL BUSY flip-flop (not shown in the figures). This signal is sensed by all units making requests to the cache, and these units consider their own request to be accepted only when the external cache busy signal is not asserted.

The NTB flip-flop, as previously discussed, is set as soon as any NT response occurs, and reset when all outstanding NT purges are completed. Therefore, all external cache requests are prevented from being accepted during this interval.

The MIH FULL BUSY flip-flop is set whenever all MIH registers are full and yet another MIH register is needed, and reset when an MIH register becomes available. This flip-flop, however, is not directly concerned with the present invention and is therefore not discussed further.

The output of purge busy flip-flop 117 may also cause a cache busy due to an external request. This PB flip-flop is used for two different and distinct purposes. First, it is set when an NT purge, as a result of an NT response, is in progress. It is also set when a purge initiated as a result of an external request is in progress. This is reflected in the logic of FIG. 6a which shows that the set input 112 to the purge busy flip-flop is the logical OR of three input signals.

The input signal on line 109 to OR circuit 116 is asserted when, for whatever reason, an external purge request is made and has been accepted by the cache. The input signal on line 110 to OR circuit 116 is asserted when NT0 flip-flop 78 of FIG. 4 is set, the purge busy flip-flop 117 is itself not yet set, and no other external requests are currently in progress. The input signal on line 110 corresponds to the case where an internal NT purge is accepted for MIH0. Similarly the input signal on line 111 to OR circuit 116 corresponds to the case where an internal NT purge is accepted for MIH1. Hence PB flip-flop 117 is set at the same time that the internal NT purge request is considered accepted. The input signal on line 110 and the input signal on line 111 to OR circuit 116 are also the same signals used to reset flip-flops NT0 FF 78 and NT1 FF 79, respectively, of FIG. 4.

Note that the control and address generation unit 71 of FIG. 3 generates addresses on line 50 in servicing external purge requests.

With respect to the untranslatable (NT) purge operation only, setting NTB FF 80 of FIG. 4 indicates an "external busy" condition (see FIG. 6b), while setting PB FF 117 indicates an "internal busy" condition. This distinction is a necessary one to maintain, since the busy circuitry must prevent all external requests from being accepted while allowing up to two internal NT purge requests to be sequenced and accepted. This circuitry must of course also insure that one untranslatable (NT) purge is not allowed to proceed until a previous one is finished. This function is accomplished in FIG. 6a by ensuring that PB flip-flop 117 is not reset until an end-of-purge condition is detected.

Figure 7:
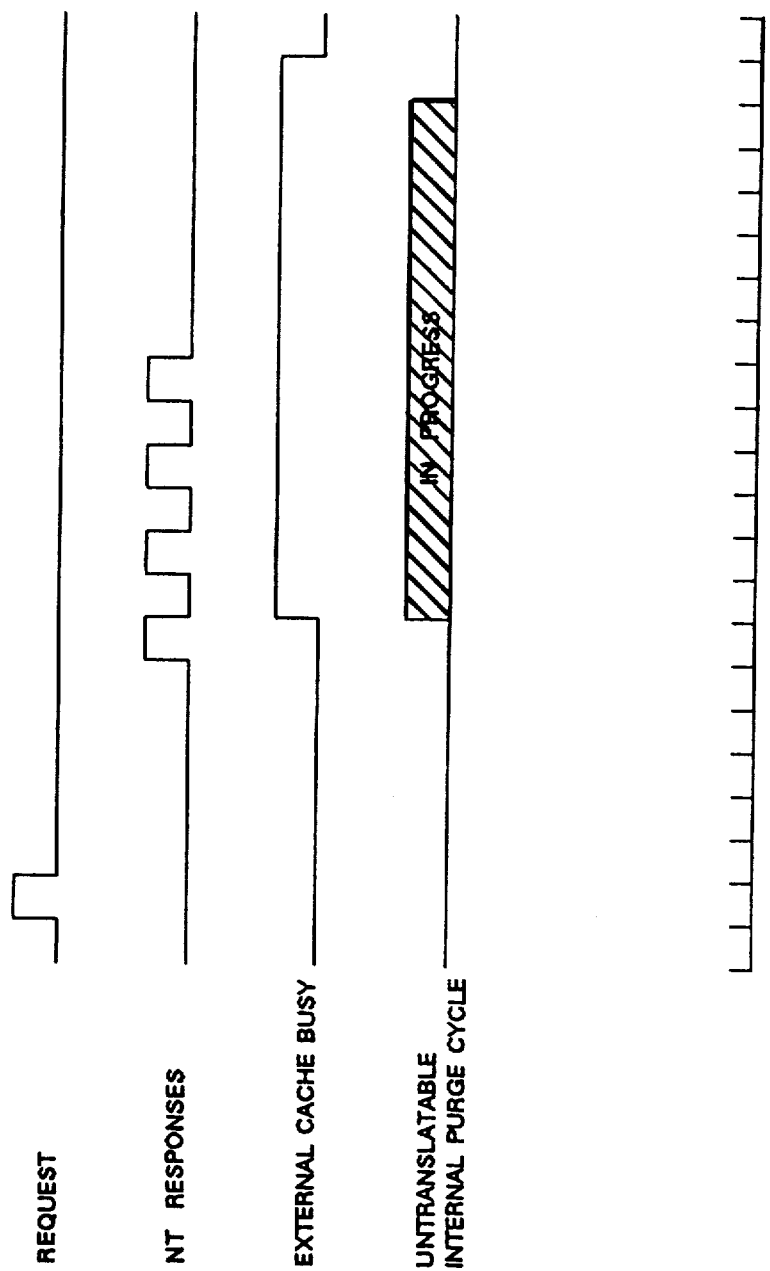
FIG. 7 is a series of timing diagrams illustrating the operation of the present invention.

FIG. 7 illustrates the sequence of events relating to an untranslatable CPU load request. The first line indicates the request to cache and the second line shows the timing of the receipt of NT responses from memory. After the first NT response, the purge busy flip flop is set initiating the untranslatable internal purge cycle. The setting of the PB flip flop also generates an external cache busy signal which signal persists until after the completion of the internal purge cycle.

When reduced to practice, the cache organization of the present invention may be implemented such that the various events comprising a cache request are separated by a non-zero number of discrete cycle time intervals. In general, this must be done in cases where the propagation delay through logic which implements the operations necessary between any two points in the cache request sequence exceeds the basic cycle time of the digital computer.

Because of this delay which may be introduced between different events within the cache request sequence and because parallelism is allowed between new cache input requests and returning responses for cache misses, certain end conditions are created which can prevent correct logical operation of the cache unless they are allowed for. Features of the present invention which ensure correct operation in the case of untranslatable (NT) responses to cache in these circumstances are now described with reference to FIG. 8.

The specific events in the cache request sequence which are of interest here are:
(1) the initiation of a new cache request; and
(2) the setting of a send-to-CPU bit (SC bit) in a previously allocated MIH register.

In the present invention, the SC bit in the MIH register, if required to be set, is not set until four basic cycle times after the initiation of the cache request in question. Those knowledgeable in the art, however, will immediately realize that the techniques to be described below can be applied to implementations in which the delay between two events is any number of cycles.

Figure 8:
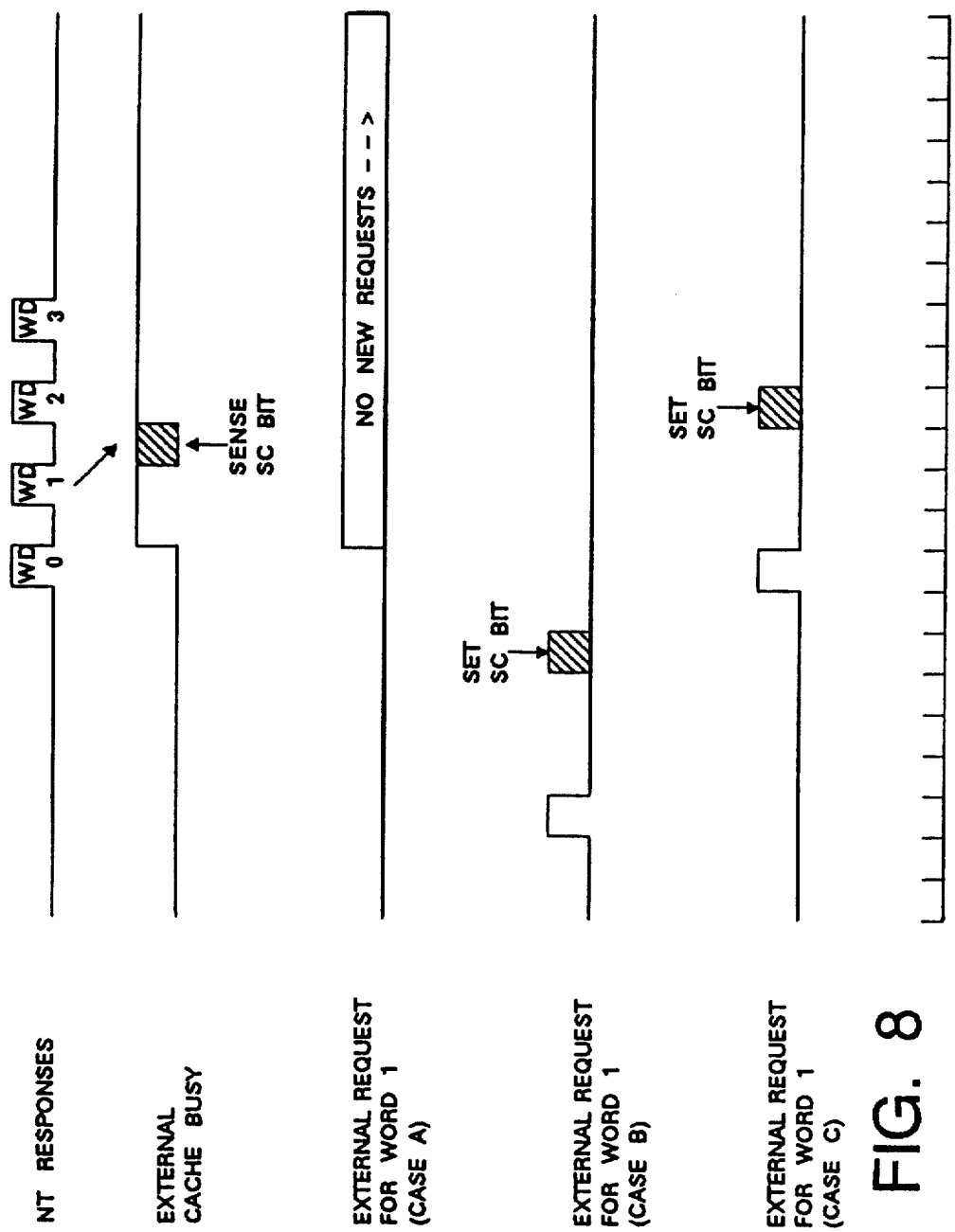
FIG. 8 is a series of timing diagrams illustrating the operation of the present invention.

Shown at the top of FIG. 8 are four untranslatable (NT) responses from the memory interface to cache corresponding to the four words (WD0 to WD3) in a line, which have occurred as a result of a previous request to cache. Immediately following the first untranslatable (NT) response, the external cache busy signal is raised to prevent the acceptance of further external requests. This is shown on the second timing line of FIG. 8.

The subsequent three timing lines in FIG. 8 illustrate three different cases in which a new request is initiated at three different times. In all of the cases, however, the request is for one of the words for which an untranslatable (NT) response occurred, specifically word number one. Therefore, if the subsequent requests were accepted, a MIH "hit" would be detected with one of the two MIH registers by comparator 85 or 86 of FIG. 4 and a send-to-CPU bit would be set in the same MIH register to indicate that the given word be forwarded to the requestor. This aspect of the cache operation was described in connection with FIG. 4.

Case A of FIG. 8 illustrates the situation in which the subsequent request arrives after the external cache busy signal was asserted. In this case, the new request is not accepted, and in fact no new requests will be accepted after the external cache busy signal is asserted until it is de-asserted again after the internal NT cache purge is complete. Logically correct operation of the cache in case A is therefore assured, since the request will not be accepted until the purge is complete and the tag directory has been marked invalid and the MIH deallocated so that the subsequent request will not result in a hit.

Case B of FIG. 8 illustrates the situation in which the new request is accepted, and the SC bit is set, before any of the untranslatable (NT) responses at the top of FIG. 8 occur. In this case, when the NT response for word one does occur, it will find the responding SC bit set (since it was just previously set by the new request) and a response from cache will be generated with the NT response code on line 35 of FIG. 2. Hence the requesting unit will receive the appropriate untranslatable response, and the cache operates correctly in case B also.

Case C of FIG. 8 illustrates a situation in which the operation of the cache is not correct unless special techniques, to be described, are employed. The new request for word number one in the cache line is accepted because it occurs just previous to the cache busy signal being asserted. However, the appropriate SC bit is not set until after the request is accepted, and in this case, in fact, it is not set until after the untranslatable response for this word has occurred. The SC bit is also not set until the cycle after the period in which this same SC bit was sensed for determining whether the response from MI for word number one should generate a subsequent response to the requestor. Therefore, unless special precautions are taken, no response will ever be generated for the request for word one. In effect, what happens is that the new request determines that the desired word is already in transit from central memory, and will arrive, but before the SC bit is set to request that this MI response be forwarded to the requestor, the response has already occurred and is lost.

The technique employed by the present invention to ensure correct operation of the cache in this situation is now described. This technique makes use of the previously described cache bypass signal 36 of FIG. 2, which is a signal from the control portion of the cache to the memory interface. When this signal is asserted, it indicates that a request which was just accepted, and is normally processed by the cache, should be passed via the ATU to central memory, with the eventual response being provided directly to the requestor via the memory interface and not from the cache. Thus a load request which detects a miss in the cache is one request which should be considered a cache bypass. Incorrect operation of the cache for the new request for word one in case C of FIG. 8 can also be corrected by considering this request to be a cache bypass request.

Figure 9:
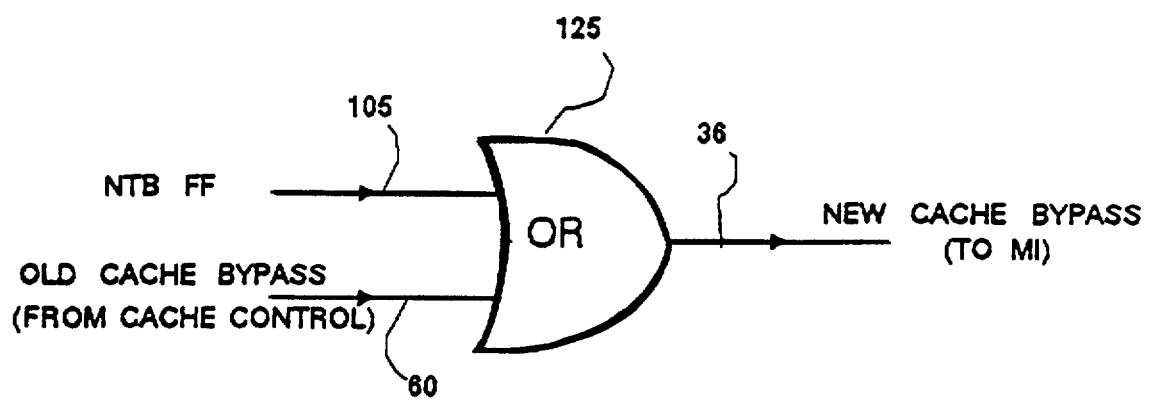
FIG. 9 is a schematic diagram of a portion of the cache memory organization of the present invention.

This request for word one is forced to be a cache bypass request by the additional circuitry shown in FIG. 9. Whenever the NTB flip-flop 80 of FIG. 4 is set, all external requests being processed are immediately declared to be cache bypass. Hence, the request in case C is passed to the ATU, is again found to be untranslatable, and an untranslatable NT response is returned directly to the requestor from the memory interface. Note that the NTB flip-flop is set immediately following any NT response, and not reset until all NT internal purges have been completed and all currently allocated MIH registers are deallocated. Therefore all external requests processed after an untranslatable memory interface NT response has occurred will be passed to the central memory via the ATU and not processed in the cache.

Forcing a cache bypass in this manner lengthens the response time for the affected requests considerably, however, since there are only a small number of requests so affected, the total effect on performance of the entire digital computer is negligible.

This invention is not to be limited by the embodiment shown in the drawings and described in the description, which is given by way of example and not of limitation, but only in accordance with the scope of the appended claims.

What is claimed is:

1. A virtual addressable cache memory organization for use with a central processing unit generating load requests and an address translation unit for translating a system virtual address to a real memory address comprising:
 (a) a virtual addressable cache memory;
 (b) cache hit determination means responsive to a load request for determining the hit or miss condition of access to a cache memory address;
 (c) address determination means for determining the cache memory address of an available location in said cache memory upon determination of a cache miss condition by said cache hit determination means;
 (d) as least one miss information holding register for storing the system virtual address of a load request and the cache memory address of an available location in said cache memory determined by said address determination means in response to said cache hit determination means determining a cache miss;
 (e) first indicator means responsive to at least one miss information holding register for indicating that the miss information holding register stores information; and
 (f) second indicator means responsive to said address translation unit being unable to translate the system virtual address in respect of the load request for which said miss information holding register was allocated for indicating that the previously allocated miss information holding register is deallocated.

2. The virtual addressable cache memory organization of claim 1 further comprising:
   (g) means responsive to a miss information holding register storing a cache memory address of an available location in said cache memory for storing the system virtual address stored in the miss information holding register in said virtual addressable cache memory at a location in said cache memory determined by the cache memory address of an available location in cache memory stored in said miss information holding register; and
   (h) internal purge means responsive to said address translation unit being unable to translate the system virtual address stored at said location in said cache memory for indicating that data stored at said location in said cache memory is invalid.

3. The virtual addressable cache memory organization of claim 2 further comprising:
   (i) means responsive to the operation of said internal purge means to bypass said cache memory.

4. The virtual addressable cache memory organization of claim 1 further comprising:
   (g) means responsive to a miss information holding register storing a cache memory address of an available location in said cache memory for storing the system virtual address stored in the miss information holding register and a valid indicator in said virtual addressable cache memory at a location in said cache memory addressed by the cache address of an available location in cache memory stored in said miss information holding register; and
   (h) internal purge means responsive to said address translation unit being unable to translate the system virtual address stored at said location in said cache memory for clearing said valid indicator.

5. The virtual addressable cache memory organization of claim 4 further comprising:
   (i) means responsive to the operation of said internal a purge means to by pass said cache memory.

6. The virtual addressable cache memory organization of claim 1 wherein said virtual addressable cache memory comprises a tag directory, a used and least recently used status memory and a data memory and further comprising:
   (g) means responsive to the storage of a cache memory address of an available location in a miss information holding register for storing the system virtual address stored in the miss information holding register to said tag directory and for storing a valid indicator in said used and least recently used status memory at a location in said tag directory and in said used and least recently used memory addressed by the cache memory address of an available location in cache memory stored in said misinformation holding register;
   (h) third indicator means responsive to said address translation unit indicating it is unable to translate the system virtual address stored in a miss information holding register for indicating that said cache memory organization is unavailable to service further request;
   (i) fourth indicator means responsive to said address translation unit indicating it is unable to translate the system virtual address stored in a miss information holding register for indicating the miss information holding register;
   (j) means responsive to said cache determination means determination of a cache miss for clearing the valid indicator at the available location in said cache memory stored in a miss information holding register indicated by said fourth indicator means;
   (k) means responsive to clearing said valid indicator for clearing said fourth indicator means;
   (l) means responsive to clearing all said fourth indicator means for clearing said third indicator means.

7. The virtual addressable cache memory organization of claim 6 wherein said means for storing a valid indicator to said used and least recently used status memory include registers associated with said at least one miss information holding register for storing the cache memory address of an available location stored in said at least one miss information holding register upon determination of a cache miss by said cache hit determination means in respect of a load request.

8. The virtual addressable cache memory organization of claim 6 further comprising:
   (m) means responsive to said fourth indicator means to bypass said cache memory.

9. The virtual addressable cache memory organization of claim 1 wherein said second indicator means includes a counter incremented each time said address translation unit is unable to translate an address in processing a load request.

10. The virtual addressable cache memory organization of claim 9 wherein said cache memory is arranged in cache lines containing words and said counter provides an overflow signal after being incremented as many times as there are words in a cache line, said overflow signal initiating de-allocation of the respective miss information holding register.

* * * * *

UNITED STATES PATENT AND TRADEMARK OFFICE
CERTIFICATE OF CORRECTION

PATENT NO. : 4,970,643
DATED : November 13, 1990
INVENTOR(S) : Colin H. Cramm

It is certified that error appears in the above—identified patent and that said Letters Patent is hereby corrected as shown below:

Column 18, lines 3 & 4, (Claim 6, lines 15 & 16) "misinformation" should be read as--miss information--

Column 18, line 10, (Claim 6, line 20) "request" should be read as--requests--

Signed and Sealed this

Thirty-first Day of March, 1992

Attest:

HARRY F. MANBECK, JR.

*Attesting Officer*  *Commissioner of Patents and Trademarks*